Patented Aug. 24, 1943

2,327,855

UNITED STATES PATENT OFFICE 2,327,855

PREPARATION OF 2,3 DICHLORDIOXANE

William P. Bitler, Haverstraw, and Leonard Nicholl, Nyack, N. Y., assignors to Kay-Fries Chemicals, Inc., West Haverstraw, N. Y., a corporation of New York No Drawing. Application August 30, 1941, Serial No. 409,038

4 Claims. (Cl. 260—338)

This invention relates to improvements in the preparation of esters of 2.3 dihydroxydioxane, and more particularly to the preparation of a desired intermediate, 2.3 dichlordioxane.

Hitherto, in the preparation of esters of 2.3 dihydroxydioxane, it has been necessary to prepare the intermediate 2.3 dichlordioxane, which is subsequently treated with an anhydrous alkali salt of a suitable organic acid. The preparation of the 2.3 dichlordioxane is carried out by direct chlorination of dioxane in which process chlorine is passed into the liquid dioxane. This reaction is quite slow. In various attempts to increase the speed of the reaction and improve the yield, various catalysts have been used, among these may be mentioned, $FeCl_3$, $CaCl_2$ and $I_2$, of which iodine appeared to be the most effective. However, even with iodine the reaction is still quite slow and not commercially practicable.

It has now been found that the chlorination reaction may be carried out very rapidly and practically completely, based on dioxane, by reacting liquid dioxane with sulfuryl chloride. The reaction is clean and characterized by the lack of by-products, and the desired product is easily separated from the reaction mixture. The finished product, 2.3 dichlordioxane, boils at 69–71° C. at 9 mm.

The reaction proceeds according to the following equation:

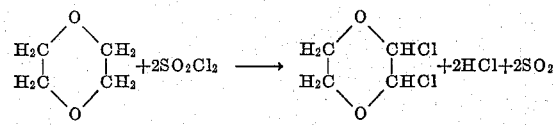

The above reaction is quite vigorous so that the temperature of the reaction mixture will rise and will have to be controlled. This is done by maintaining the reaction mixture at a temperature of 80 to 90° C., and adding the sulfuryl chloride gradually to avoid overheating. The reaction may be carried out in a time period of three and one-half to four hours, with the final reaction temperature, after addition of the sulfuryl chloride, being raised to 85-95° C. Following this, all the hydrogen chloride and sulphur dioxide are expelled by heating, up to a temperature of 165° C. The yields based on dioxane are 80-85%, and on sulfuryl chloride 70%, compared to approximately 60% obtained by the methods of direct chlorination.

The improved process exhibits the marked advantages of (1) higher yield; (2) shorter time of reaction; and (3) no by-products.

A specific example of the process is as follows: 2,030 grams of sulfuryl chloride are added slowly to 685 grams of dioxane (5% excess). The reaction mixture is maintained around 80-90° C. until after all the sulfuryl chloride is added. The temperature is then raised gradually to drive out the reaction products sulphur dioxide and hydrogen chloride. The temperature is finally raised up to 165° C., when substantially all of the sulphur dioxide and hydrogen chloride will have been driven off. The reaction mixture becomes very dark colored above 110° C. The crude product is then distilled at 9 mm. The distillation chart is as follows: 140 grams up to 72° C., 890 grams at 69–71° C. and 40 grams above 71° C. Assuming the first portion to be dioxane, a yield of 91.7% on dioxane and 75.5% on sulfuryl chloride is indicated. As noted above, this compares favorably to a yield of 60% claimed by previous workers for a direct chlorination with chlorine.

It will now be appreciated that there has been disclosed a novel process for the direct chlorination of dioxane to form 2.3 dichlordioxane by reaction of dioxane with halides of sulphur and particularly sulfuryl chloride.

What is claimed is:

1. The process for manufacturing 2.3 dichlordioxane which consists in heating para-dioxane to a temperature of 80 to 90° C., adding sulfuryl chloride gradually to the heated material to completion of the reaction.

2. The process for manufacturing 2.3 dichlordioxane according to the following equation:

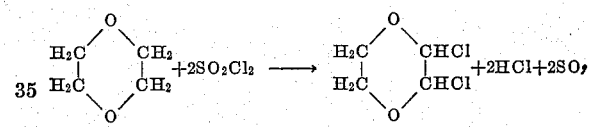

which comprises heating para-dioxane to a temperature of 80 to 90° C., adding sulfuryl chloride thereto to completion of reaction, and then raising the temperature to 165° C. to drive off all the hydrochloric acid and sulphur dioxide.

3. The process for directly chlorinating para-dioxane to form 2.3 dichlordioxane without the use of catalysts, comprising adding sulfuryl chloride gradually to a bath of liquid para-dioxane maintained at a temperature of 80 to 90° C.

4. The process for directly chlorinating para-dioxane to form 2.3 dichlordioxane without the use of catalysts, comprising adding sulfuryl chloride gradually to a bath of liquid paradioxane maintained at a temperature of 80° to 90° C., and then heating the mixture to a temperature of 85° to 95° C., said heating at 80° to 95° C. being for a time period of three and one-half to four hours.

WILLIAM P. BITLER.
LEONARD NICHOLL.